United States Patent
Dragon et al.

(10) Patent No.: US 6,854,936 B2
(45) Date of Patent: Feb. 15, 2005

(54) SWITCHING DEVICE FOR PNEUMATIC CONVEYOR

(75) Inventors: Christoph Dragon, Neutraubling (DE); Andreas Seidl, Donaustauf (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 10/322,918

(22) Filed: Dec. 18, 2002

(65) Prior Publication Data

US 2004/0120776 A1 Jun. 24, 2004

(30) Foreign Application Priority Data

Dec. 20, 2001 (DE) .......................................... 101 62 827

(51) Int. Cl.[7] .............................................. B65G 51/24
(52) U.S. Cl. ................................... 406/182; 193/31 A
(58) Field of Search ................................ 406/181, 182; 193/31 A; 198/442

(56) References Cited

U.S. PATENT DOCUMENTS

| | | | |
|---|---|---|---|
| 3,337,159 A | * 8/1967 | Hoehmann et al. | 406/83 |
| 3,829,042 A | * 8/1974 | Torochkov et al. | 406/182 |
| 5,100,265 A | * 3/1992 | Mirkin | 406/86 |
| 5,567,091 A | 10/1996 | Johnson et al. | |
| 5,611,647 A | * 3/1997 | Ouellette | 406/88 |
| 5,810,516 A | 9/1998 | Ouellette | |
| 6,257,805 B1 | * 7/2001 | Bernard | 406/182 |

FOREIGN PATENT DOCUMENTS

| | | |
|---|---|---|
| EP | 0 649 804 A1 | 4/1995 |
| EP | 0649804 B1 | 3/1996 |
| FR | 2 824 544 A1 | 11/2002 |

* cited by examiner

Primary Examiner—Joseph Dillon, Jr.
(74) Attorney, Agent, or Firm—Marshall, Gerstein & Borun LLP

(57) ABSTRACT

The invention relates to a switching device for air conveyors for bottles, preforms or similar parts, which can be transported, suspended by their neck in the pneumatic conveyor, where the pneumatic conveyor presents fixed conveyor track sections. The switching device is characterized by the fact that at least one shifting device, which is shiftable with respect to the fixed conveyor track sections, is provided with at least one conveyor track section.

16 Claims, 4 Drawing Sheets

SWITCHING DEVICE FOR PNEUMATIC CONVEYOR

FIELD OF THE INVENTION

The invention relates to a switching device for pneumatic conveyor by means of which, in particular, plastic bottles can be transported, suspended by their neck, where the air conveyor presents fixed conveyor track sections.

BACKGROUND OF THE INVENTION

Such air conveyors are used for the transport of PET bottles. It may be necessary to change the path which a bottle takes on the way from or to different processing and work stations for bottles.

For this purpose a rotating table switch is known from EP 0 649 804. In the case of this switch, a rotating table is provided with three tracks, where, depending on the position of the rotating table, the bottle can move from the incoming into the opposite conveyor tracks, or a bottle can be transferred from one conveyor track to the other, diagonally opposite, conveyor track.

The drawback in this context is that, independently of the path which a bottle should take, the bottle always must pass through a curved track, resulting in instability of the bottle, even if there is no switch to a conveyor track, and in a reduction of the maximum conveyor speed and a high production rate.

SUMMARY OF THE INVENTION

The problem of the present invention therefore is to create a switching device by means of which bottles can be transferred from any incoming conveyor track, as desired, into any outgoing conveyor track, at the highest possible transport speeds and at high production rates.

Because different conveyor track sections are provided, any connections can be established between the fixed conveyor track sections. Thus, it is possible to create straight connections over the entire distance between the incoming conveyor tracks and the opposite removal tracks, so that there are no limitations in the transport speed due to curved sections. As a result, for the position of the switching device where the bottle passes directly through, without being transferred, the switching device sets no limits to the speed or the capacity.

For positioning the shiftable conveyor track sections compared to the fixed conveyor track sections, a sufficient precision must be achieved to achieve an easy transition of the bottle from a fixed into a moveable, and from the moveable into a fixed conveyor track section. If the positioning is imprecise, steps or edges are produced which can impede the transport of the bottles.

This capacity for precise positioning is achieved advantageously by abutments by means of which an exact positioning of the moveable part at the preset abutment is possible.

In the case of switching device with two shifting devices and a rotating conveyor track section which can rotate, all the required conveyor track configurations can be formed, where each moveable part should only be moved back and forth between exactly two different positions, which can be given by optionally adjustable abutments. Such a device is thus particularly advantageous because the high precision of positioning can be achieved cost advantageously and with low expenditures for construction, and the overall switching device can be very compact.

BRIEF DESCRIPTION OF THE DRAWINGS

Advantageous embodiments of the invention are explained below with reference to the figures. In the drawing.

DETAILED DESCRIPTION

Figure 1:
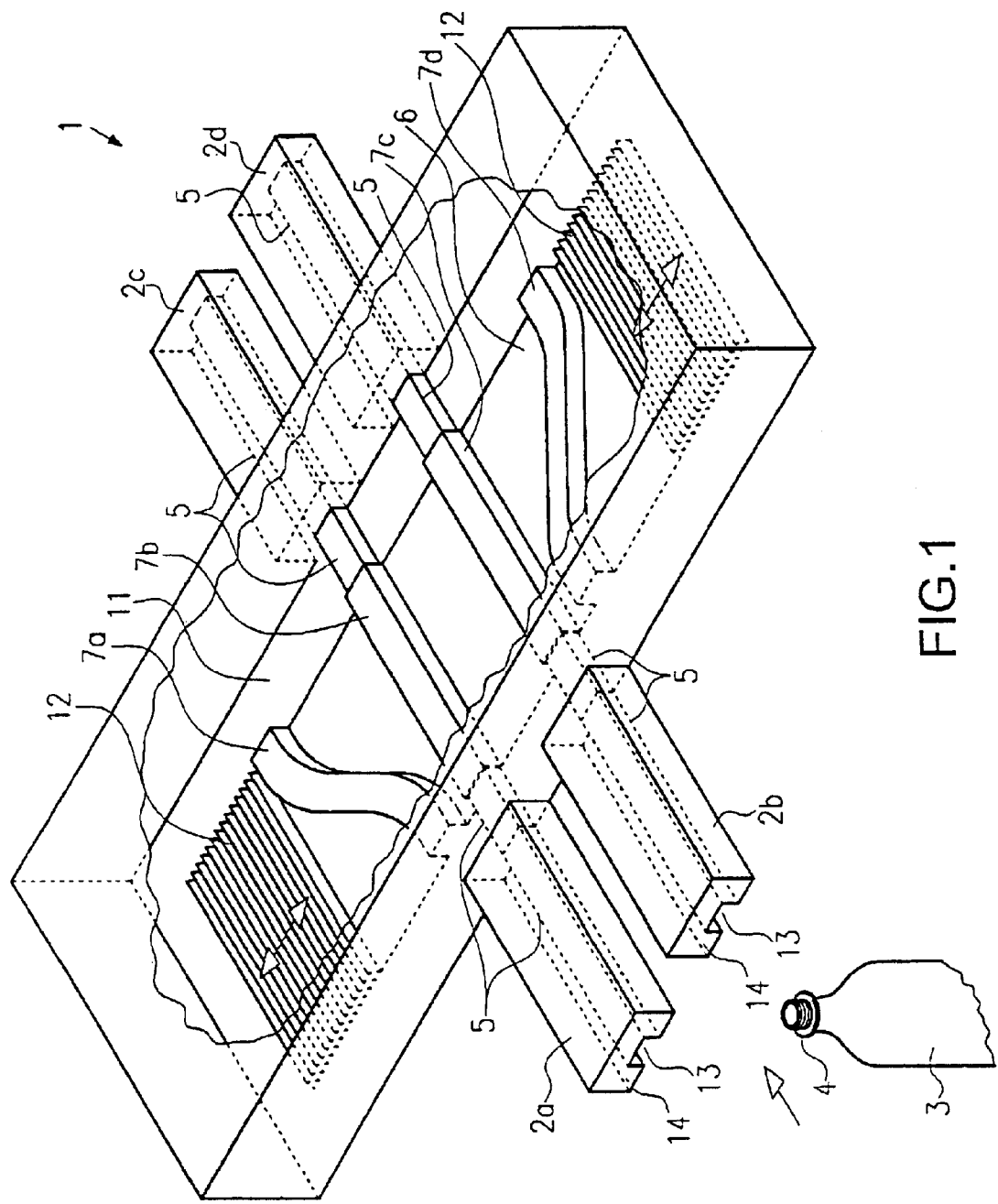
FIG. 1 shows a three-dimensional schematic view of an advantageous embodiment variant of the present invention.

In FIG. 1, the switching device with reference numeral 1 is drawn. In the switching device 1. Air conveyors 2a and 2b with fixed conveyor track sections 5 lead to the switching device 1. The pneumatic conveyors have a channel-like designed head area 13, in which the head of a bottle 3, which presents a support ring, can move, as well as a pressurized air area 14, in which air is pumped by a pump which is not shown; from there the air flows out through small openings into the direction of conveyance, and thus it moves the bottle 3. In the switching device 1, a shifting device 6 is provided, which here is represented substantially in the shape of a plate. The shifting device 6 is provided, or attached in a moveable manner, at the bottom side of the switching device 1. On the shifting device 6, conveyor track sections 7a, 7b, 7c and 7d are shown, which can be moved jointly with the shifting device 6. The conveyor track sections 7a–7d are accessible from below, and they are open downward, and designed as guide channels with air outlet openings corresponding to the fixed sections 5. The sections 7b and 7c are in the shape of a straight line and they allow transport along a straight path by the the switching device 1 from the incoming track 2a to the removal track 2c, and from the incoming 2b to the removal track 2d.

The conveyor track sections 7a and 7d which are S-shaped make it possible to switch the track of the bottle. If a bottle 3 has to be transferred from the incoming track 2a into the removal track 2d, the shifting device 6 in FIG. 1 can be shifted backward to the left so that the entry of the conveyor track section 7d covers the incoming track 2a, and the outlet of the shiftable conveyor track section 7d is aligned with the removal track 2d. Accordingly, the oppositely curved shiftable conveyor track section 7a serves the purpose of achieving a track switch from the inlet track 2b to the removal track 2c. At the external ends of the shifting device 6, pleated bellows 12 are arranged. The pleated bellows 12 allow an air-tight closing of the openings, which could result from the shifting of the shifting device 6 between the latter and a base plate 11.

To ensure the transport of the bottles in the shiftable conveyor track sections, the conveyor track sections 7a–7d can be surrounded, each individually, or in groups, by pressurized air areas which hold them together. The latter are not represented in FIG. 1 to avoid overloading the figure. However, it is possible to supply the entire interior of the switching device 1 with pressurized air which then affects the transport of the bottles 3 via corresponding slits or nozzles at or on the shiftable conveyor track sections 7a–7d.

In the embodiment represented in FIG. 1, the shifting device 6 is shifted diagonally to the direction of conveyance, which is along the conveyor track 2a–2d. However, it is also possible to shift the shifting device 6 diagonally to the direction of conveyance. In addition, a curved embodiment variant of the shifting device 6 is also possible.

The shifting device 6 is, as shown in FIG. 1, is held in the recess of the base plate 11, and it is arranged in a manner so it can be moved. On the base plate 11, fixed conveyor track sections 5 are provided. It is also possible for the interior of the housing to contain only the shiftable conveyor track sections 7a–7d.

The shifting of the shifting device 6 can be carried out with a pneumatic, electric, hydraulic, mechanical or other setting devices. In this context, advantageous setting devices are those which allow a precise positioning of the shifting device 6.

Figure 2:
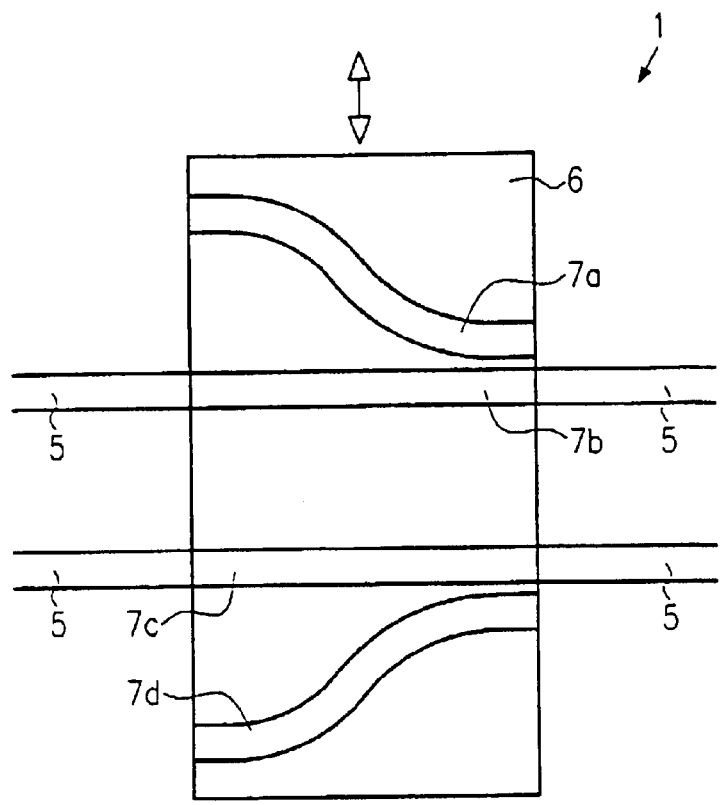
FIG. 2 shows a schematic view of the embodiment variant of FIG. 1 seen from below.

FIG. 2 is schematic representation of the device of FIG. 1 in a view from below. One can clearly see how, with a different conveyor track sections 7a–7d, it is possible to achieve the transfer of a bottle from any incoming conveyor to any removal conveyor.

Figure 3:
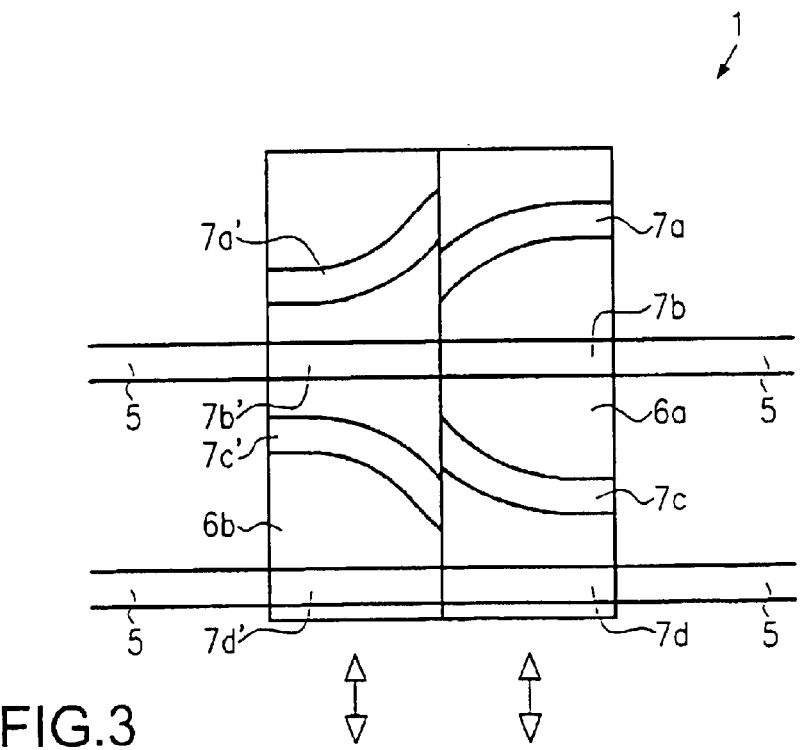
FIG. 3 shows a schematic representation from below of an advantageous embodiment variant of the present invention.

FIG. 3 shows an additional embodiment variant of the invention, in which two shifting devices are provided. The shifting devices are arranged one after the other in the direction of transport, and each contains parts 7a, 7b, 7c, 7d, 7a', 7b', 7c', 7d' of the shiftable conveyor track sections. In the represented arrangement, the bottles can follow a straight path through the switching device. By shifting the shifting device 6a and 6b, it is possible to obtain an overlap of the conveyor tracks sections 7a and 7a' so that the transport of a bottle from the bottom left to the bottom right, or vice versa, in FIG. 3, is possible. It is also possible with the shiftable conveyor track sections 7c and 7c', to achieve bottle transport from the upper left to the lower right, or vice versa, in FIG. 3. Instead of the representation given in FIG. 3, it is also possible to provide more than two, for example three, four or even more, shifting devices 6. It is also possible for more than four conveyor track sections 5 to be present.

Figure 4A:
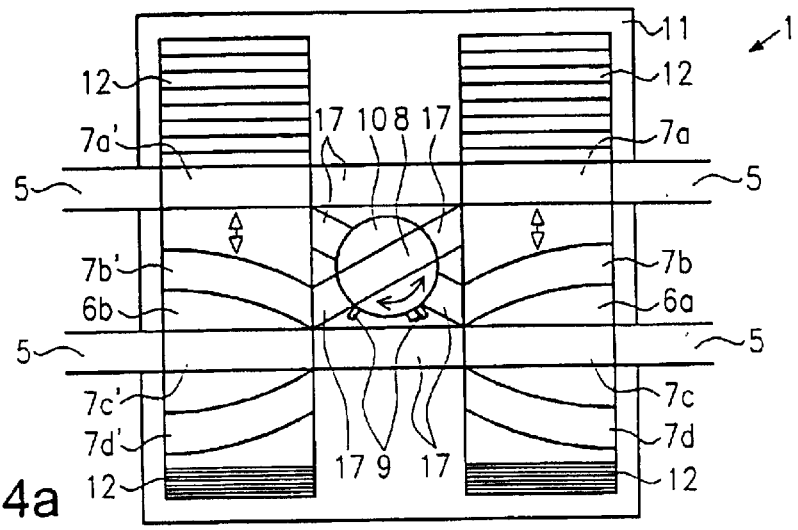
FIGS. 4a–4c show schematic views from below of an advantageous embodiment variant of the present invention.
Figure 4B:
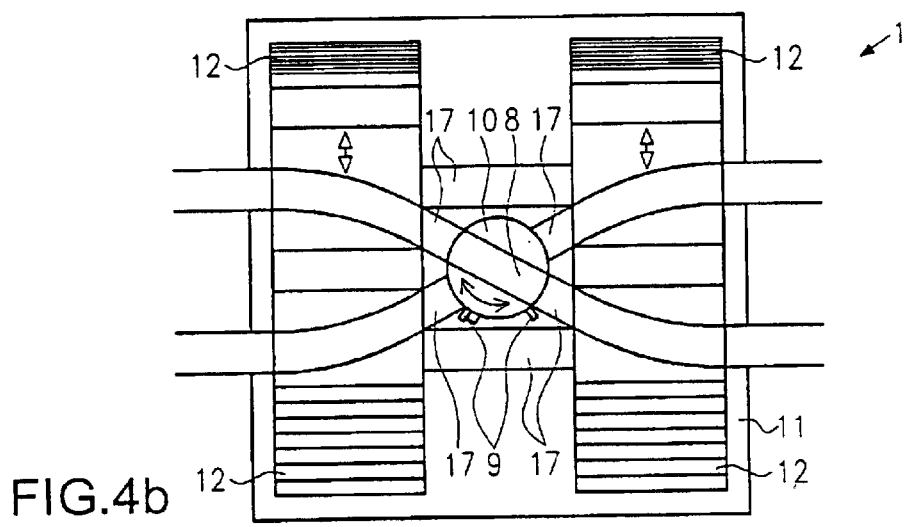
Figure 4C:
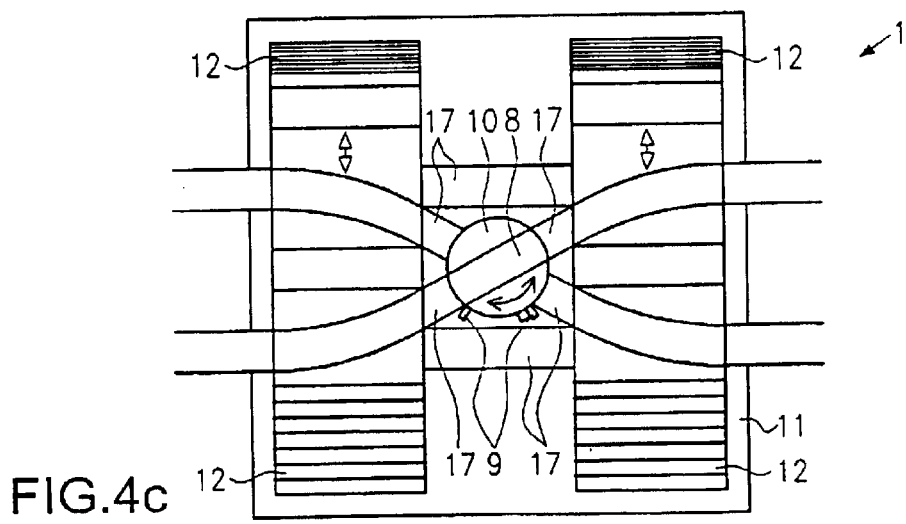

A particularly advantageous embodiment variant of the invention is represented in FIGS. 4a–4c. Here, two shifting devices 6a and 6b are provided, with separation between them, one after the other in the transport direction of the bottles. Between the shifting devices 6a and 6b, a rotating conveyor track section 5 which can be rotated is arranged. The rotating conveyor track section 8 is arranged on a rotating disk 10. By shifting the shifting devices 6a and 6b and by rotating the rotating conveyor track section 8, the required configurations of conveyor track sections, as shown in FIGS. 4a, 4b and 4c, can be achieved. With the arrangement of two shifting devices 6a and 6b with different conveyor track section 7a, 7b, 7c, 7d, 7a', 7b', 7c', 7d' and a rotating conveyor track section 8 as well as intermediate connecting conveyor track sections 17, one achieves, on the other hand, relatively small shift paths of the shifting devices 6a and 6b, so that a compact switching device which takes up little space is possible. On the other hand, the switching device shown in FIGS. 4a–4c presents the advantage that both the shifting devices 6a and 6b as well as the rotating conveyor track section 8 can be arranged in only precisely two positions, which are defined by means of abutments. As a result, it is possible to achieve a precise positioning of the moving part, even with cost advantageous setting devices (pneumatic cylinder or similar part). No expensive control is required for this purpose.

In addition, the shifting devices 6a and 6b can always be moved parallel to each other, that is synchronously, so that only one setting device for the shifting device 6a and 6b is required, if the two parts are connected.

For the rotating disk 10, the abutments 9 which limit the rotation of the rotating disk 10 and thus of the rotating conveyor track section 8 are represented in FIGS. 4a-4c. For the shifting devices 6a and 6b, such abutments are not represented in FIGS. 4a–4c.

In FIGS. 4a–4c, pleated bellows 12 are provided above and below the shifting devices 6a and 6b, which function as air-tight covering devices.

Because, in the switching device 1 as represented in FIGS. 4a–4c, the moveable parts 6a, 6b and 10 are always moved back and forth between only two positions, and these positions can be defined by means of abutments, a rapid movement of the shiftable parts 6a, 6b and 10 in the corresponding abutment position is possible. As a result it is possible, in a simple manner, to achieve a rapid and at the same time precise switching of the switching device for the different positions.

Figure 5:
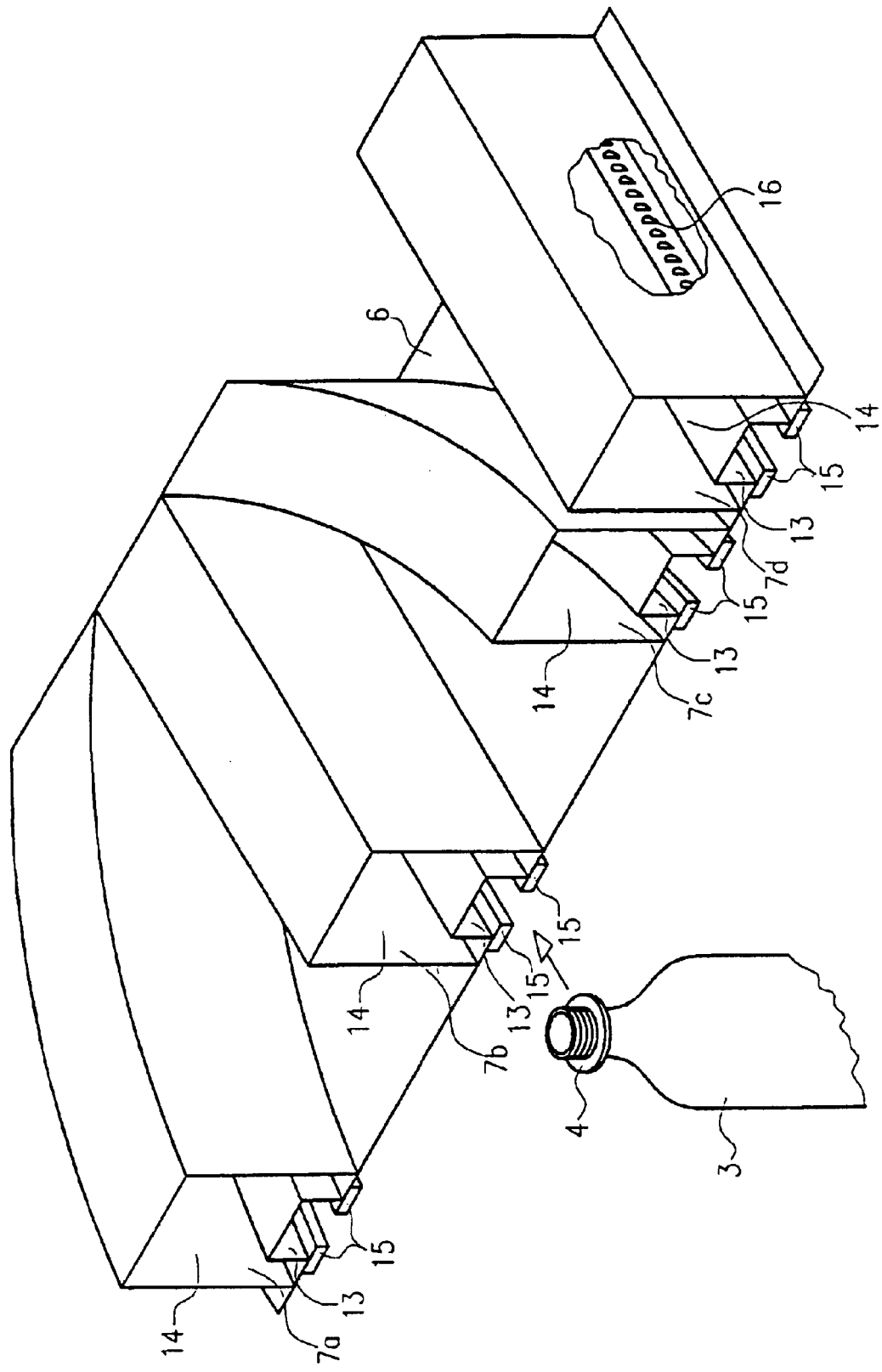
FIG. 5 shows a schematic three-dimensional representation, of a part of an advantageous embodiment variant of the present invention.

FIG. 5 represents a shifting device 6, which can be used in the device in FIG. 3 or 4. In FIG. 5, for the shiftable conveyor track section 7d, the laterally arranged air slits 16 are represented, by means of which air can be blown laterally in the direction of conveyance onto the head of a bottle 3, in order to move it. The air, which flows through the slits 16, is supplied from the pressurized air area 14. The pressurized air area 14 here surrounds a part of, or the entire, shiftable conveyor track section 7d.

At the lower end of each shiftable conveyor tracks 7a–7d, support ledges 15 are shown on which the neck 4 of the bottles 3 rest during the transport.

While, in FIG. 5, four individual pressurized air areas 14 are represented, the pressurized air areas can also be held together for the different shiftable conveyor track sections, so that a pressurized air area supplies pressurized air for several conveyor track sections. Moreover, the pressurized air areas can also be substantially larger or substantially smaller than represented in FIG. 5.

While the connection of the shiftable conveyor track section 7 in FIG. 5 is ensured by a plate, the connection can also be made by other ways, for example with braces or similar parts.

One or more shifting devices 6 can also be divided in the shifting direction (for example diagonally with a respect to the direction of conveyance of the bottles) into two or more shifting devices 6 each having one or more shiftable conveyor track sections. The individual shifting devices 6 can be such that they can be shifted independently of each other. Furthermore, the shifting device 6 can substantially consist of a conveyor track section.

In the switching device 1, moreover, suspended railings or guide rods can be provided, which are attached at the height of the body of the bottle 3, to guide the latter laterally. The railings can be provided for the fixed and for the shiftable conveyor track sections 7a–7d, and also for the rotating conveyor track section 8. The railings can be fixed or moveable. Advantageously, the housing of the switching device 1 is largely closed. As a result, one prevents the introduction of dust into the switching device and pressure loss. The closing can be achieved by providing one or more plates with the shifting device 6 and/or by a rotating disk 10 in the case of the rotating conveyor track section 8 and/or by the pleated bellows 12.

We claim:

1. Switching device (1) comprising
a pneumatic conveyor (2), which conveys plastic bottles (3) suspended by their neck (4) and includes at least two pneumatic incoming straight tracks (2a, 2b) and two pneumatic removal straight tracks (2c, 2d);

at least one shifting device (6) which moves back and forth along a straight direction substantially perpendicular to the tracks (2a, 2b, 2c, 2d) of the pneumatic conveyor (2); and a number of shifting conveyor track sections (7a, 7b, 7c, 7d), which are provided on the shifting device (6) and each of which connects one of the incoming tracks (2a, 2b) to one of the removal tracks (2c, 2d), and wherein at least one of the shifting conveyor track sections (7a, 7b, 7c, 7d) is a straight conveyor track (7b, 7c), which runs the entire distance from a selected one of the incoming straight tracks (2a, 2b) into a corresponding one of the removal straight tracks (2c, 2d).

2. Switching device (1) according to claim 1, and further including a rotating conveyor track section (8) which can be rotated.

3. Switching device (1) according to claim 2, and comprising two shifting devices (6a, 6b) spaced apart from one another, and wherein the rotating conveyor track section (8) is arranged between the two shifting devices (6a, 6b).

4. Switching device (1) according to claim 2, wherein the rotating conveyor track section (8) is connected with a rotating disk (10).

5. Switching device (1) according to claim 2, and further including two abutments (9) which limit the rotation of the rotating conveyor track section (8).

6. Switching device (1) according to claim 3, and comprising a base plate (11) which receives the shifting devices (6), the rotating conveyor track section (8), and the rotating disk (10).

7. Switching device (1) according to claim 1, wherein the shifting device (6) includes abutments.

8. Switching device (1) according to claim 1, and comprising cover devices (12) provided at opposite ends of the shifting device (6) relative to the straight direction of the shifting device (6).

9. Switching device (1) according to claim 1, and comprising a mechanical setting device for setting the shifting device (6).

10. Switching device (1) according to claim 1, and comprising railings for laterally guiding the bottles (3).

11. Switching device (1) according to claim 8, wherein the cover devices (12) are pleated bellows.

12. Switching device (1) according to claim 1, and comprising a hydraulic setting device for setting the shifting device (6).

13. Switching device (1) according to claim 1, and comprising an electric setting device for setting the shifting device (6).

14. Switching device (1) according to claim 1, and comprising a pneumatic setting device for setting the shifting device (6).

15. Switching device (1) comprising a pneumatic conveyor (2), which conveys plastic bottles (3) suspended by their neck (4) and comprises at least two incoming straight tracks (2a, 2b) and two removal straight tracks (2c, 2d);

two shifting devices (6) which are spaced apart from one another and move back and forth along a straight direction substantially perpendicular to the tracks (2a, 2b, 2c, 2d) of the pneumatic conveyor (2);

a number of shifting conveyor track sections (7a, 7b, 7c, 7d), which are provided on each of the shifting device (6); and a rotating conveyor track section (8) which can be rotated and is arranged between the two shifting devices (6a, 6b).

16. Switching device (1) comprising a pneumatic conveyor (2) which conveys plastic bottles (3) suspended by their neck (4) and comprises at least two incoming straight tracks (2a, 2b) and two removal straight tracks (2c, 2d);

at least one shifting device (6) which moves back and forth along a straight direction substantially perpendicular to the tracks (2a, 2b, 2c, 2d) of the pneumatic conveyor (2);

a number of shifting conveyor track sections (7a, 7b, 7c, 7d) provided on the shifting device (6) and each of which connects one of the incoming straight tracks (2a, 2b) to one of the removal straight tracks (2c, 2d), and wherein at least one of the shifting conveyor track sections (7a, 7b, 7c, 7d) is a straight conveyor track (7b, 7c), which runs the entire distance from at least one of the incoming straight tracks (2a, 2b) into at least one of the removal straight tracks (2c, 2d); and pleated bellows operatively associated with the shifting device and arranged at opposite ends of the shifting device (6) relative to the straight direction.

\* \* \* \* \*

UNITED STATES PATENT AND TRADEMARK OFFICE
CERTIFICATE OF CORRECTION

PATENT NO. : 6,854,936 B2
DATED : February 15, 2005
INVENTOR(S) : Christoph Dragon et al.

It is certified that error appears in the above-identified patent and that said Letters Patent is hereby corrected as shown below:

<u>Title page,</u>
Item [30], Foreign Application Priority Data,
please delete "101 62 827" and replace with -- 101 62 827.7 --.

Signed and Sealed this

First Day of November, 2005

JON W. DUDAS
*Director of the United States Patent and Trademark Office*